June 7, 1927.  R. P. BROWN  1,631,578
RECORDING INSTRUMENT
Filed June 1, 1925
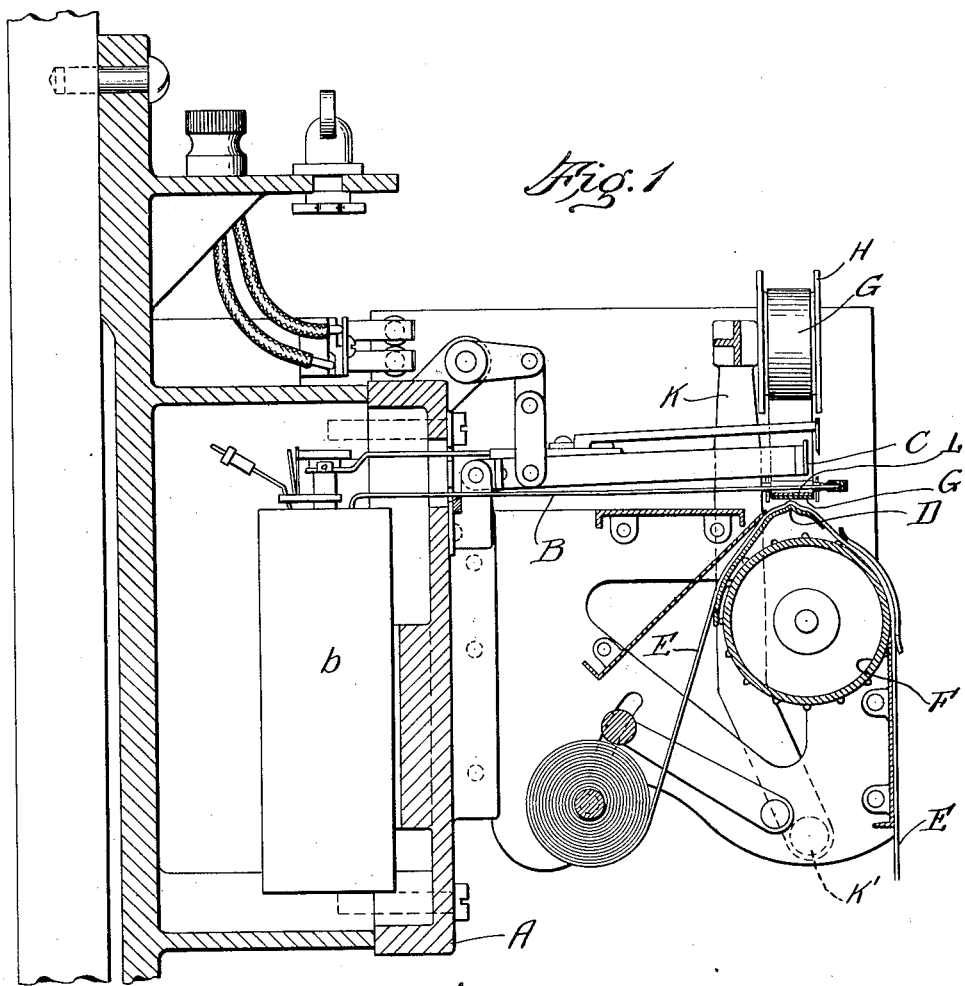
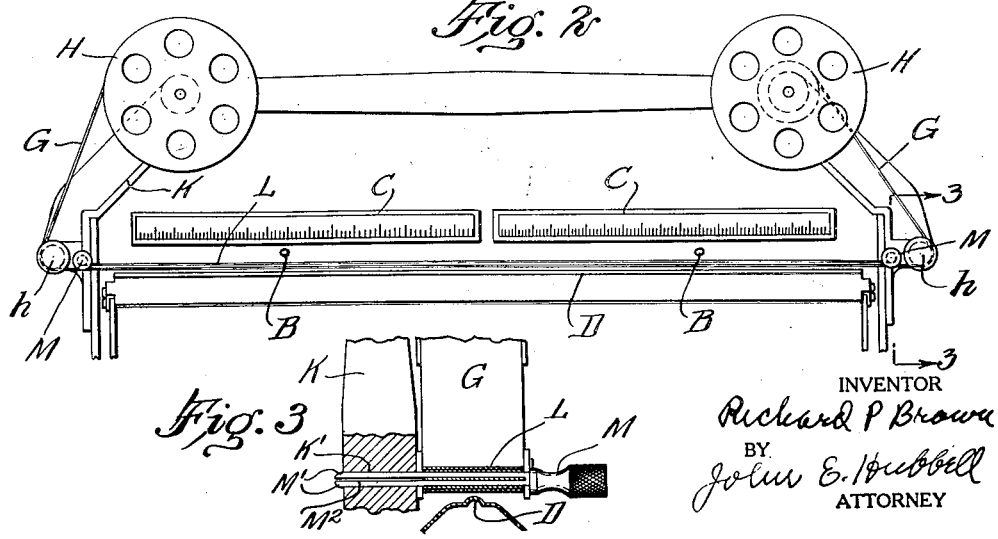
INVENTOR
Richard P Brown
BY
John E. Hubbell
ATTORNEY

Patented June 7, 1927.

1,631,578

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING INSTRUMENT.

Application filed June 1, 1925. Serial No. 33,944.

My present invention relates to electric recording instruments of the type in which a record is made on a travelling record sheet by intermittently depressing the pointer of a meter element to thereby force a suitable transfer medium interposed between the pointer and the record sheet into contact with the latter. An inked cloth strip or ribbon is in many respects the most desirable form of transfer medium for use in such instruments. In the operation of recording instruments of this character, difficulty has been experienced in the use of an inked cloth transfer medium, because the fibres on, and projecting from the ribbon, and other surface irregularities of the ribbon occasionally interfere with the free movement of the meter pointer, and such interference also arises from the ink and fibres which adhere to the pointer when it is depressed into contact with the ribbon. Such adhering ink and fibres, moreover, not only interfere with the meter movements, but also interfere with the formation of desirably sharp record impressions on the record sheet. Such difficulties are especially serious because the meters usually employed in such instruments are delicate and sensitive. This difficulty in the past has led to the use of a transparent or translucent paper record sheet with the transfer medium beneath and facing the sheet. It has also led to the extensive use of carbon paper as a transfer medium in place of the ordinary ink ribbon. While the difficulties mentioned above are wholly or largely eliminated by the use of carbon paper as the transfer medium, the carbon paper is, generally speaking, a less desirable medium than an inked cloth strip or ribbon, particularly when the medium is composed of differently colored strips or side by side portions as is required for the production of multiple records with a single meter.

The object of the present invention is to provide effective means for overcoming the heretofore existing objections to the use of an inked cloth strip as a transfer medium in a recording instrument of the type referred to. This object is obtained in accordance with the present invention by interposing between the transfer ribbon and the instrument pointer a suitable shield, which may advantageously be formed by a strip of oiled silk, tracing cloth or analogous material, and which prevents the instrument pointer from contacting with the transfer medium. Advantageously, simple and effective provisions are made for supporting the ribbon shield in a manner facilitating its ready renewal of the shield member, and for its ready adjustment to interpose fresh portions between the pointer and the transfer medium, when other portions become worn as a result of their repeated engagement by the pointer.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Of the drawings:

Fig. 1 is a sectional elevation of a portion of a recording instrument;

Fig. 2 is a front elevation of the portion of the mechanism shown in Fig. 1; and Fig. 3 is a section on the line 3—3 of Fig. 2.

In the drawings I have illustrated the use of the present invention in a duplex recording instrument comprising a framework A in which are mounted two galvanometers $b$, each with a swinging pointer B having its free end intermittently depressed by a depressor bar C to momentarily force an inked cloth ribbon G into contact with the portion of a record sheet E then immediately above a marking edge or anvil D. The record sheet E is a paper strip advanced by a suitably rotated feed roll F. The inked ribbon is wound off of one, and onto another of two rolls H carried by a supporting frame K, and the ribbon in passing from one roll H to the other passes around two guide rollers $h$ carried by the frame K, one at each end of the marking edge D. The frame K is pivotally connected to the instrument framework at K' to permit the ribbon G to be shifted laterally with respect to the edge D. In so far as above described, the instrument shown in the drawings embraces no part of the present invention, but, on the contrary, is of a general type which is well known and is in extensive use, and in its specific construction is of the character disclosed in my prior application Serial No. 756,435, filed December 17, 1924.

In accordance with the present invention, the instrument shown in the drawings is provided with a shield L interposed between the instrument pointers B and the inked ribbon G. The shield L, as shown, consists of a strip of flexible material which may well be oiled silk, tracing cloth or the like, and extends above the marking edge D for the full length of the latter. As shown, the ends of the strip L are removably and adjustably connected to the transfer ribbon supporting frame K by means of studs or supporting pins M. As shown, each pin comprises a cylindrical body portion longitudinally slitted and has the corresponding end of the ribbon L received in the slit $M^2$ between the bifurcations M', with an adjacent portion of the ribbon wound about the latter. The pins M are longer than the width of the strip L, so that the inner end of each pin M may be received in a corresponding socket K' formed in the frame member K, the parts being so proportioned that each split pin will be frictionally held in place in its socket K' so as to hold taut the portion of the shield strip extending between the two pins. By simultaneously rotating the two pins M in their sockets K', the shield member L may be adjusted longitudinally of its length from time to time to put fresh portions of the shield L in place beneath the positions most commonly occupied by the instrument pointers B. The simple and effective shield supporting provisions obviously make it a simple matter to renew the ribbon L from time to time when the need for renewal arises. The shield supporting provisions employed also make it possible to hold the shield L directly above and closely adjacent the active portion of the transfer ribbon G at all times, so that the vertical movement imparted to the needles B in making records need not be appreciably increased. The shield L made and supported as described, forms a barrier, impervious to fibres and ink, between the inked ribbon G and the meter needles B, and presents a smooth contact surface to the latter. It will be understood, of course, that the invention is equally useful in an instrument having a single needle B as in the duplex instrument shown.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. In a recording instrument comprising a meter pointer, means for supporting and advancing a record sheet, a transfer medium interposed between the record sheet and the pointer, and means for intermittently depressing the latter to cause the transfer medium to make a mark on the record sheet, the improvement which consists in a flexible shield interposed between the needle and the transfer medium.

2. In a recording instrument comprising a meter pointer, means for supporting and advancing a record sheet, an inked ribbon interposed between the record sheet and the pointer, means for intermittently depressing the latter to cause the transfer medium to make a mark on the record sheet and a frame provided with supports for end portions of said ribbon, the improvement which consists in means carried by said frame for supporting the ends of a strip of flexible material interposed between the needle and the ribbon.

3. In a recording instrument comprising a meter pointer, means for supporting and advancing a record sheet, an inked ribbon interposed between the record sheet and the pointer, means for intermittently depressing the latter to cause the transfer medium to make a mark on the record sheet and a frame provided with supports for end portions of said ribbon, the improvement which consists in pins rotatably mounted in said frame, and a strip of flexible shield material interposed between the needle and the ribbon and having its ends secured to said pins.

Signed at Philadelphia, in the county of Philadelphia, and State of Pennsylvania, this 28 day of May, A. D. 1925.

RICHARD P. BROWN.